United States Patent
Farwell

[11] Patent Number: 5,996,605
[45] Date of Patent: Dec. 7, 1999

[54] RUPTURE DISK SAFETY MEMBER

[75] Inventor: Stephen P. Farwell, Owasso, Okla.

[73] Assignee: BS&B Safety Systems, Inc., Tulsa, Okla.

[21] Appl. No.: 09/004,503

[22] Filed: Jan. 8, 1998

Related U.S. Application Data

[62] Division of application No. 08/547,311, Oct. 24, 1995.

[51] Int. Cl.⁶ .................................................... F16K 17/16
[52] U.S. Cl. ...................................... 137/68.21; 137/68.26; 137/68.27
[58] Field of Search .............................. 137/68.21, 68.26, 137/68.27, 68.28, 68.29

[56] References Cited

U.S. PATENT DOCUMENTS

| | | |
|---|---|---|
| 3,834,580 | 9/1974 | Ludwig et al. ................... 137/68.26 X |
| 3,921,556 | 11/1975 | Wood et al. . |
| 4,043,481 | 8/1977 | Herbst . |
| 4,158,422 | 6/1979 | Witten et al. .................... 137/68.29 X |
| 4,236,648 | 12/1980 | Wood et al. . |
| 4,347,942 | 9/1982 | Jernberg et al. . |
| 4,479,587 | 10/1984 | Mundt et al. ..................... 137/68.21 X |
| 4,513,874 | 4/1985 | Mulawski . |
| 4,597,505 | 7/1986 | Mozley et al. . |
| 4,738,372 | 4/1988 | Jernberg . |
| 4,759,460 | 7/1988 | Mozley . |
| 5,005,722 | 4/1991 | Short, III et al. . |
| 5,368,180 | 11/1994 | Farwell et al. ................... 137/68.21 X |

*Primary Examiner*—John Fox
*Attorney, Agent, or Firm*—Finnegan, Henderson, Farabow, Garrett & Dunner, L.L.P.

[57] ABSTRACT

The present invention provides an improved rupture disk apparatus and manufacturing method. The apparatus includes a rupture disk having at least one area of weakness formed by the displacement of material through a partial shearing motion. The weakened area is capable of withstanding pressure cycling because the rupture disk flange acts to support the weakened area during use. The apparatus further includes a safety member adjacent to the rupture disk on the outlet side to ensure opening, the safety member having at least one rupture-initiating, stress-concentrating point positioned to contact the rupture disk weakened area.

17 Claims, 5 Drawing Sheets

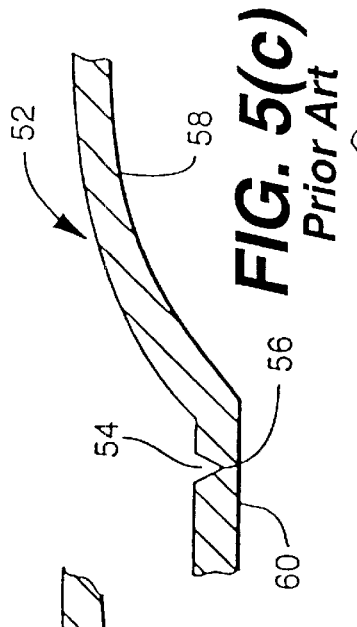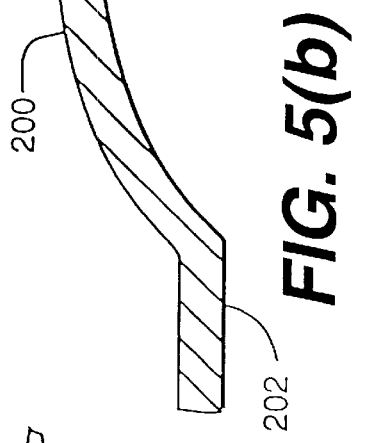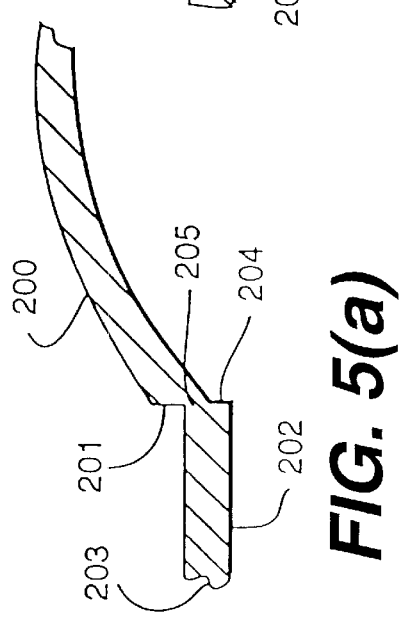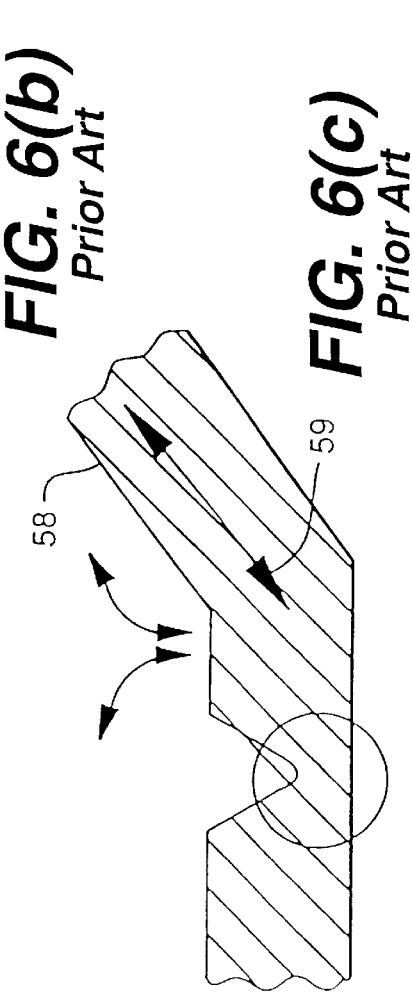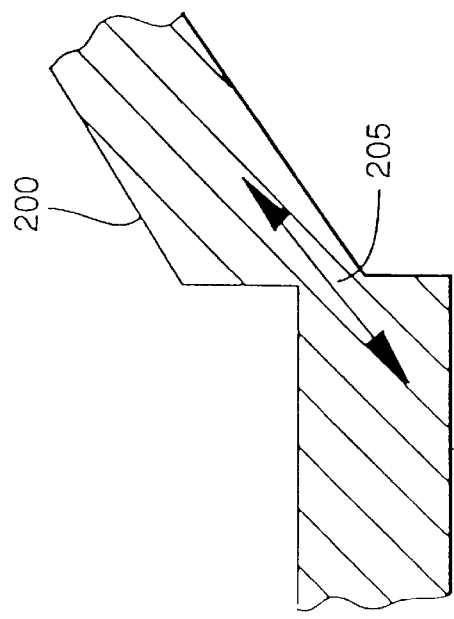
FIG. 5(a)
FIG. 5(b)
FIG. 5(c) Prior Art
FIG. 6(a)
FIG. 6(b) Prior Art
FIG. 6(c) Prior Art

RUPTURE DISK SAFETY MEMBER

This is a division of application Ser. No. 08/547,311, filed Oct. 24, 1995, the contents of which are hereby incorporated herein by reference.

BACKGROUND OF THE INVENTION

1. Field of the Invention

The present invention relates generally to rupture disk apparatus and manufacturing methods, and more particularly, to rupture disks, assemblies, and manufacturing methods wherein the rupture disks have an area or areas of weakness to facilitate opening of the disk.

2. Description of the Prior Art

A great many pressure relief devices of the rupture disk type have been developed and used. Generally, such devices include a rupture disk supported between a pair of support members or flanges, which are in turn connected to a relief connection in a vessel or system containing pressurized fluid. When the pressurized fluid within the vessel or system exceeds the design rupture pressure of the rupture disk, the disk ruptures causing pressurized fluid to be relieved from the vessel or system.

Rupture disks fall into the general categories of forward acting tension type disks and reverse acting disks. Certain forward acting tension type disks have been developed using a score line in the surface of the disk to ensure opening at a specific area. More recently, reverse buckling rupture disks have also included scores formed on a surface to define an area or areas of weakness such that upon reversal, the disk tears in such area or areas of weakness. Scored reverse buckling rupture disk manufacturing methods are described in U.S. Pat. No. 4,441,350 to Short et al. issued on Apr. 10, 1984 and U.S. Pat. No. 4,458,516 issued to Naumann on Jul. 10, 1984.

While scored reverse buckling rupture disks have been used successfully and have obviated the need for knife blades in a number of applications, fragmentation and/or tearing away of portions of the disks can still be a problem. That is, upon the reversal and rupture of the scored reverse buckling rupture disk in the area or areas of weakness defined by the scores, fragmentation and tearing away of parts from the disk can occur. These same fragmentation and tearing away problems may also occur in tension loaded rupture disks.

To reduce the chances of fragmentation upon rupture, C-scored techniques have been developed. Such disks include, but are not limited to, an area or areas of weakness formed by one or more scores which define a circular or similar blow-out portion hinged to the reminder of the disk by an unweakened hinge area. Also, with respect to reverse acting disks, rupture disk assemblies have been developed that include a support member to contact the disk as it reverses and thereby lessen the chance of tearing away. For example, U.S. Pat. No. 5,167,337 to Short et al. issued Dec. 1, 1992 describes a C-scored reverse buckling rupture disk assembly that includes an inwardly extending support member for preventing the blow-out portion of the disk from fragmenting or tearing away at the hinge upon rupture.

A general problem in the manufacture of scored rupture disks that has continued to exist is that the tooling used to form the scores can be and often is damaged when the disk material is scored too deeply. For example, score dies of the type described in U.S. Pat. Nos. 4,441,350 and 4,458,516 cited above can be and often are collided together which dulls or breaks the score blades requiring their repair or replacement. Yet another problem with conventional scoring techniques is that the material directly under the score blade becomes work hardened such that it may be difficult to score the disk to a desired thinness.

Another problem that has existed in scored rupture disks prior to the present invention is the premature failure of the disks due to pressure cycling. Pressure cycling occurs in many rupture disk applications and includes positive pressure variations, as well as going from a positive to a negative pressure. Fluctuation in the pressure of the pressurized fluid exerted on the rupture disks may cause them to flex, which in turn may cause the material forming the disks to fatigue and fail at the score or scores in the disks. This in turn results in the development of leaks and/or the premature failure of the disks. The industry has attempted to minimize this fatiguing problem by supporting the scored region with, for example, the rupture disk head. However, this approach has not completely relieved the problem.

Thus, there is a continuing need for improved rupture disks, assemblies and methods which obviate the above mentioned problems.

SUMMARY OF THE INVENTION

Improved rupture disks, rupture disk assemblies, and manufacturing methods are provided which meet the needs described above and overcome the shortcomings of the prior art. The improved rupture disks of this invention have an area or areas of weakness therein at which the disks rupture or open. The invention is comprised of a rupturable member formed of a material, preferably malleable, adapted to be sealingly engaged in a pressurized fluid passageway. The disk includes at least one weakened region comprised of material displaced by a partial shearing movement to thereby form a thinner cross section than the remainder of the disk, with the material being displaced in a shear direction. The weakened region is formed in or adjacent to the rupturable member such that it defines an area of weakness for opening, yet does not result in a region that is susceptible to fatigue failure. In this regard, the flange of the disk can act to support the weakened region and avoid the need to utilize a separate support member.

The rupture disk of the present invention may include a flange having an inner and outer peripheral edge, the flange being offset from the rupturable member of the disk to expose the peripheral edge of the rupturable member and the inner peripheral edge of the flange. The peripheral edge of the rupturable member and the inner peripheral edge of the flange will be exposed on opposite sides of the fluid passageway, i.e., on the inlet side of the disk and on the outlet side of the disk. The weakened area includes a thinner cross section than the flange and rupturable member.

The improved rupture disk assemblies of the present inventions are comprised of inlet and outlet rupture disk support members, a rupture disk having an area or areas of weakness which define a blow-out portion in the rupture disk, and a safety member positioned between the rupture disk and the outlet support member having a configuration for preventing the blow-out portion of the rupture disk from fragmenting or tearing away upon rupture and having at least one rupture initiating, stress concentrating point positioned to contact the rupture disk upon reversal to ensure opening. The stress concentrating point(s) is preferably positioned to contact the rupture disk at the weakened area.

A method of producing improved rupture disks having an area or areas of weakness along which the disks rupture is also provided. The method comprises the steps of forming a rupturable member, preferably of malleable material, adapted to be sealingly engaged in a pressurized fluid passageway, and forming an area or areas of weakness in or adjacent to the rupturable member, by displacing material with a partial shearing motion. The weakened area or areas is/are preferably formed using dies which are offset and are incapable of colliding. The weakened area may be formed such that the flange of the rupture disk acts as a support for the weakened area. As such, the fatigue life of the disk is improved when subjected to pressure variations in the fluid passageway.

Finally, a method of ensuring that a reverse buckling rupture disk having an area or areas of weakness formed therein ruptures after reverse buckling. The method comprises placing a safety member adjacent to the rupture disk on the outlet side of the rupture disk, the safety member having at least one rupture initiating, stress concentrating point positioned to contact the rupture disk at the area of weakness when the rupture disk reverse buckles.

It is an object of the present invention to provide an improved weakened region in a rupture disk to facilitate opening of the disk at the predetermined pressure rating, the improvement consisting of the weakened region having a longer fatigue life and not needing a separate support member.

It is yet another object of the present invention to provide a rupture disk assembly that ensures opening of a reverse buckling rupture disk upon reversal.

It is still another object of the present invention to provide a method of forming a weakened region in a rupture disk that is reliable, not prone to the tooling being damaged, and superior to conventional scoring techniques.

Other and further objects, features, and advantages of the present invention will be readily apparent to those skilled in the art upon a reading of the description of preferred embodiments which follows when taken in conjunction with the accompanying drawings.

BRIEF DESCRIPTION OF THE DRAWINGS

FIG. 5(*a*) is a cross-sectional view of a rupture disk of the present invention, illustrating a cross section of the disk at the weakened area.

FIG. 5(*b*) is a cross-sectional view of a rupture disk before a weakened area is formed in the disk.

FIG. 5(*c*) is a cross-sectional view of a rupture disk having a prior art weakened area.

FIG. 6(*a*) is a cross-sectional view of a rupture disk of the present invention illustrating the support of the weakened area provided by the flange.

FIG. 6(*b*) is; a cross-sectional view of a prior art rupture disk illustrating the unsupported weakened area.

FIG. 6(*c*) is a cross-sectional view of a prior art rupture disk illustrating a bending action that tends to occur at the weakened area.

DESCRIPTION OF THE PREFERRED EMBODIMENTS

Aspects of the present invention will now be described in conjunction with a reverse buckling rupture disks. It must be understood, however, that the present invention is not so limited. It should be further understood that the description provided is illustrative of the present invention and not intended to be limiting of the inventive concepts set forth in the patent claims.

Figure 7:
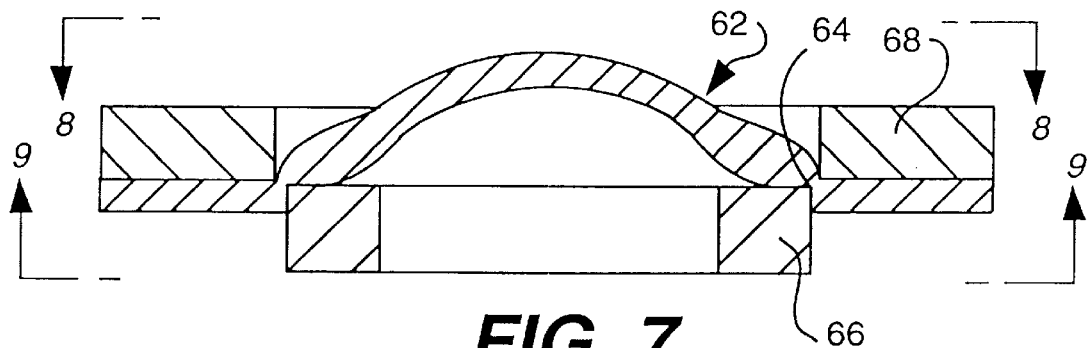
FIG. 7 is a side cross-sectional view of the improved reverse buckling rupture disk of this invention, including the tooling dies used to form the weakened area.

Referring now to the drawings, and particularly to FIGS. 1–4, a rupture disk assembly of the present invention including a reverse buckling rupture disk having an area of weakness defined therein is illustrated and generally designated by the numeral 10. As shown in FIG. 7, in this embodiment the area of weakness is in the form of a continuous C-shaped curve. The assembly 10 is comprised of an inlet rupture disk support member 12 and an outlet rupture disk support member 14. A reverse buckling rupture disk and safety member assembly generally designated by the numeral 11 is shown clamped between the support members 12 and 14 by a plurality of bolts 16. The support member 12 is sealingly connected to a conduit 18 which is in turn connected to a vessel or system (not shown) containing pressurized fluid to be protected. The support member 14 is sealingly connected to a conduit 20 which leads pressurized fluid relieved through the rupture disk assembly 11 to a point of disposal, storage or the like. Although not shown, support members 12 and 14 can be connected to corresponding pipe flanges. The rupture disk and safety member assembly 11 is clamped between the support members 12 and 14. A pair of gaskets 24 and 26 can be utilized, although in many instances such gaskets are unnecessary.

The rupture disk assembly 11 of the present invention is comprised of a rupture disk 28, such as the illustrated reverse buckling disk, and an annular safety member 36. The rupture disk 28 is preferably formed of a malleable material and has an area of weakness 30 defined, therein by an area or areas of material displaced by a partial shearing motion. As shown in FIG. 5(*a*) and as described more fully below, this partial shearing motion causes material displacement, but does not cut the disk. The area of weakness 30 shown in FIGS. 1–4 in effect creates a continuous curved line of weakness along which the disk will tear, when subjected to a predetermined pressure differential. The rupture disk 28 is positioned adjacent to the gasket 24, which is in turn positioned adjacent to the inlet support member 12. The safety member 36 is positioned adjacent to the rupture disk 28, and the gasket 26 is positioned between the safety member 36 and the outlet support member 14. If gaskets 24 and 26 are omitted from the assembly of FIG. 1, the rupture disk 28 will contact the inlet support member and the safety member 36 will contact the outlet support member.

Figure 1:
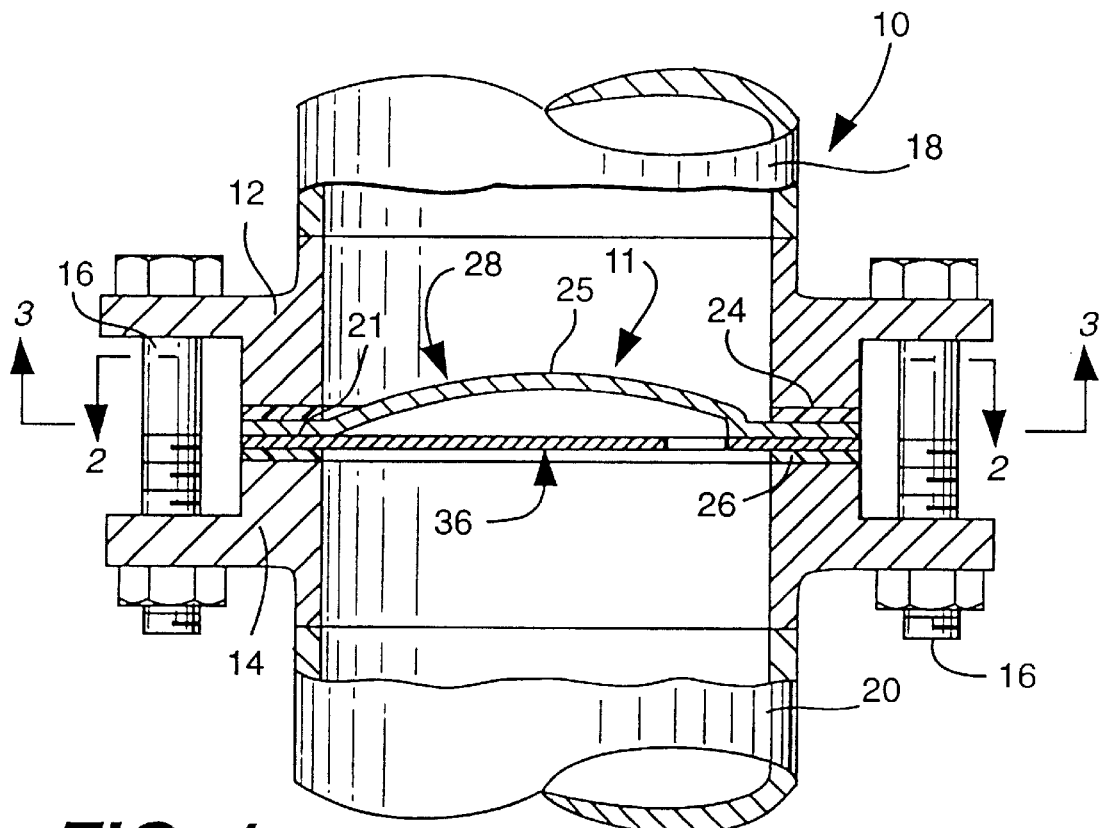
FIG. 1 is a side cross-sectional view of a reverse buckling rupture disk assembly of the present invention clamped between a pair of conventional pipe flanges.
Figure 2:
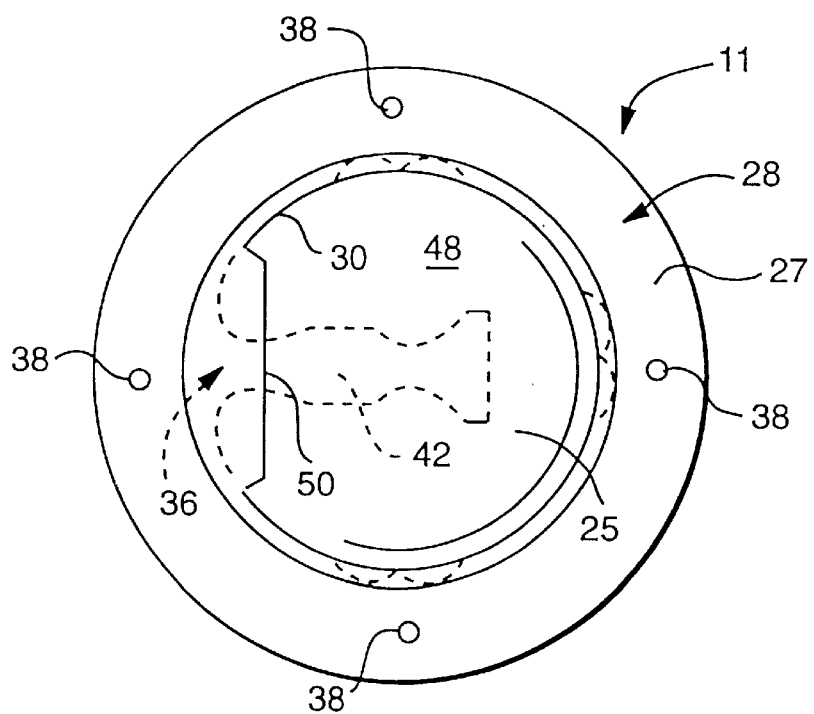
FIG. 2 is a partial view taken along line 2—2 of FIG. 1.

As shown best in FIGS. 1 and 2, the rupture disk 28 includes a convex-concave portion 25 connected to an annular flange portion 27. The convex-concave portion forms a convex surface in the side of the rupture disk 28 adjacent the inlet support member 12 and a corresponding concave surface in the side adjacent the outlet support member 14. The area of weakness 30 formed by an area or areas of material displaced by a partial shearing movement in the reverse buckling rupture disk 28 defines a substantially circular blow-out portion 483, which is connected to the rupture disk 28 by an unweakened hinge area 50 between the opposite ends of the line of weakness 30, i.e., the hinge area 50 corresponds to a chord of the substantially circular blow-out portion 48.

Figure 3:
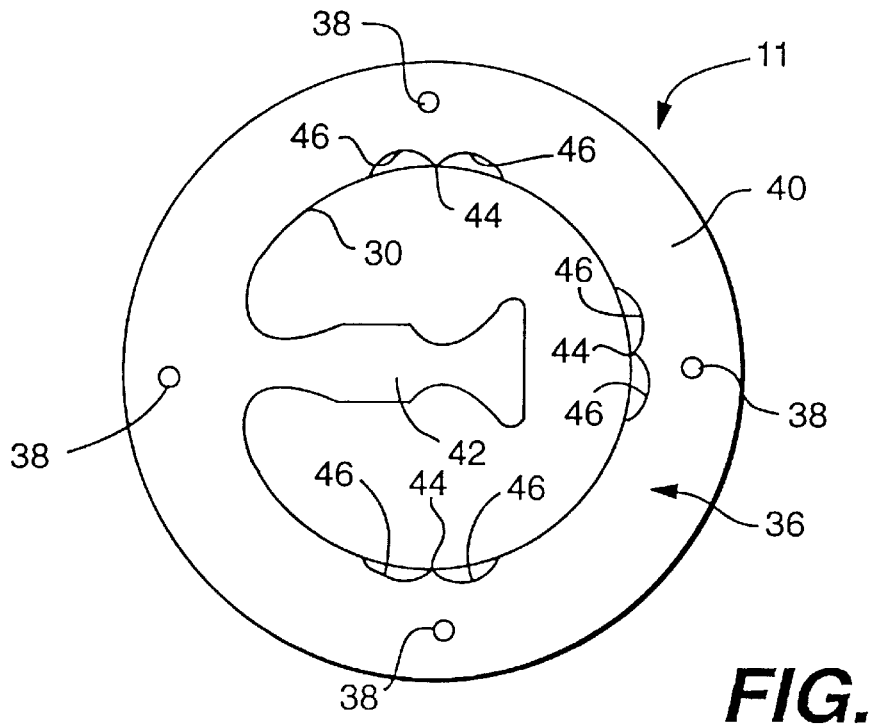
FIG. 3 is a partial view taken along line 3—3 of FIG. 1.

As shown in FIG. 3, the safety member 36 is comprised of an annular ring 40. In the preferred embodiment, this annular ring is in immediate face-to-face contact with the flange portion 27 of the rupture disk. The inner diameter of the annular ring 40 preferably has a diameter that is just slightly less than the diameter of the C-shaped, curved line or area of weakness 30, so that the disk upon rupture can freely open without interference.

In the presently preferred embodiment, three rupture initiating, stress concentrating points 44 are provided on the inside edge of the annular ring 40 for contacting the rupture disk 28 when it reverse buckles, but does not rupture. The points 44 are formed by pairs of adjacent arcuate cut-outs 46 in the ring 40. As shown in FIGS. 2 and 3, at least the reverse buckling rupture disk 28 and the safety member 36 are preferably attached together such as by means of spot welds 38. The annular ring 40, the stress concentrating points, and the arcuate cut-outs 46 are configured in combination so that the stress concentrating points 44 will contact a portion of the area 30 of weakness, should the disk reverse buckle but not immediately tear open. For example, if the reverse buckling disk 28 reverses but does not immediately tear along the areas 30 of weakness and the disk is subjected to increased pressure, the disk adjacent the concentrating points 44 will move or deform into the arcuate cut-out areas 46 and effectively force the intermediate portion into contact with the points, initiating tearing along the weakened area 30.

Figure 4:
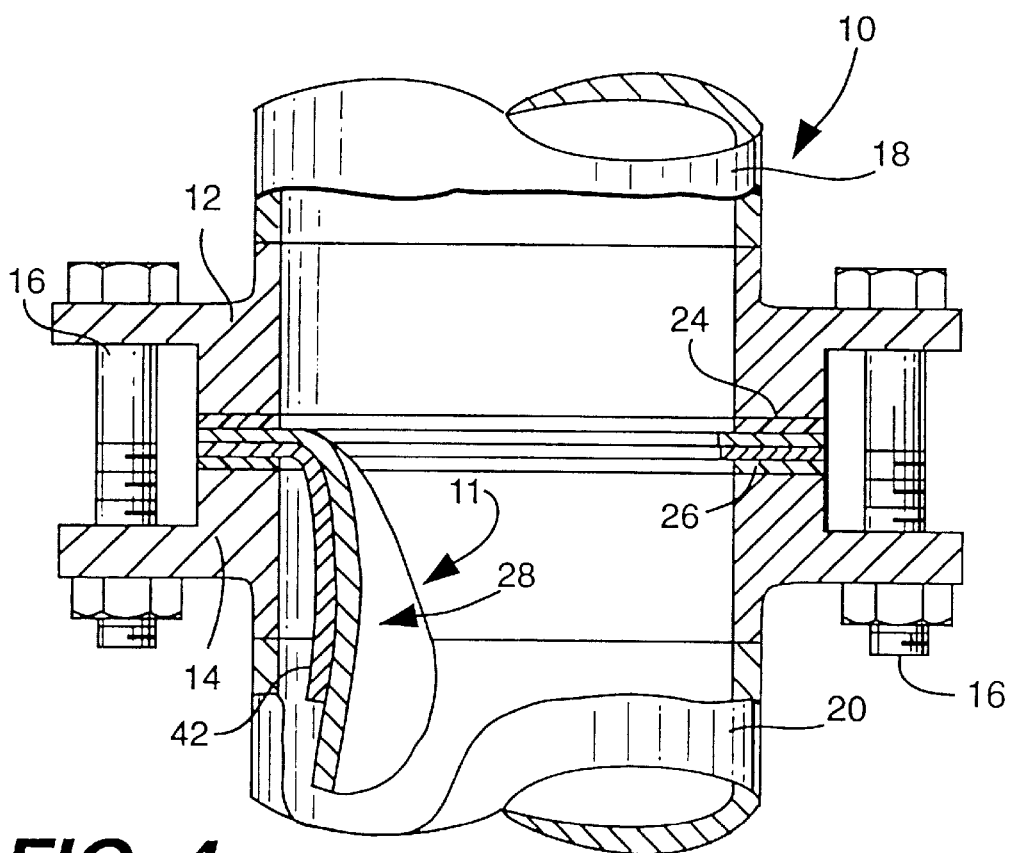
FIG. 4 is a side cross-sectional view of the assembly of FIG. 1 illustrating the assembly after the rupture disk has reversed and ruptured.

Preferably, the safety member 36 includes a member to contact the disk upon reversal. In the presently preferred embodiment, catcher bar 42 is positioned adjacent the hinge area 50 and extends at least partially across the open interior of the outlet support member 14. Upon reversal and rupture, the hinge area 50 of the rupture disk 28 is supported and the blow-out portion 48 thereof is contacted and slowed down as it and the blow-out portion 48 bend into the open interior of the support member 14 as shown in FIG. 4. The support of the hinge area 50 and slowing down of the blow-out portion 48 of the rupture disk 28 by the catcher bar 42 prevent the blow-out portion 48 from fragmenting or tearing away from the remaining portion of the rupture disk 28.

FIG. 5 provides a comparison of the prior art with the present invention. FIG. 5(b) represents a rupture disk having a rupturable member 200 and a flange 202. FIG. 5(a) represents a disk formed according to the present invention. FIG. 5(c) represents a disk formed by prior art scoring techniques.

The improved reverse buckling rupture disk of the present invention has an area or areas of weakness defined therein by an area or areas of material displaced in a shear direction. The area is preferably formed by two die members which are slightly offset from each other, but have two edges which are almost aligned with each other, as shown in FIG. 7 and described in more detail below. As shown in FIG. 5(a), the rupture disk of the present invention can include a central rupturable member 200 that will tear away from the rest of the disk at a predetermined pressure, the rupturable member including a peripheral edge 201. The disk further includes a flange 202 having an inner and outer peripheral edge 203 and 204, respectively. The flange is offset from the rupturable member to expose the peripheral edge of the rupturable member and the inner peripheral edge of the flange. This offset results in a weakened area 205 formed between these peripheral edges and having a thickness less than the thickness of the flange and rupturable member. Depending upon the tooling used, the edges of the flange and rupturable member may be radiused. As shown in FIG. 7, bulges may be formed in areas adjacent to the weakened area as a result of material displacement.

In certain instances, the peripheral edge of the rupturable member will be substantially parallel to and substantially aligned with the inner peripheral edge of the flange. As shown in FIG. 5(a), the inner peripheral edge of the flange 204 and the peripheral edge of the rupturable member 201 are formed on opposite sides of the fluid passageway and are substantially aligned. The peripheral edge of the rupturable member may be formed on the inlet side and the inner peripheral edge of the flange is formed on the outlet side. Alternatively, the peripheral edge of the rupturable member may be formed on the outlet side, and the inner peripheral edge of the flange may be formed on the inlet side.

When a reverse buckling rupture disk is placed in operation, i.e., clamped between support members with pressurized fluid pressure exerted on the inlet side and atmospheric or a lower pressurized fluid pressure exerted on the outlet side, the rupture disk is placed in compression. Because the area of weakness 205 in the rupture disk moved the disk material upwardly as shown in FIG. 6(a), the compressive forces are transmitted to the peripheral flange portion 202 of the disk, whereby the shear stress placed on the area or areas of material displaced by the partial shearing movement is relatively low. Thus, although the material of weakened region 205 is thinner than the remainder of the disk and hence will constitute the area at which the disk will open, the weakened region is nonetheless capable of withstanding pressure variations. It is therefore not necessary to support the weakened area of the rupture disk of the present invention.

In contrast to the present invention, the conventional, prior art scored rupture disk wherein a v-shaped notch is cut into the disk is illustrated in FIGS. 5(c), 6(b) and 6(c). The term "score" is used herein to mean a groove or notch formed in one side of a rupture disk by a knife blade or similar tool to produce a line of weakness in the rupture disk whereby upon failure of the rupture disk, it tears along the line of weakness. Referring to FIG. 5(c), the prior art scored reverse buckling rupture disk 52 includes a score 54 which is essentially a groove formed in one side of the disk. The remaining thin portion 56 of the disk material beneath the score 54 connects the central blow-out portion 58 of the disk to the peripheral flange portion 60. The score 54 thus forms a line of weakness in the disk, and heretofore, one or more such scores have been utilized to form circular and other shaped blow-out portions connected by unweakened hinge portions in reverse buckling rupture disks.

As mentioned, when such prior art disks are subjected to pressure cycling, the disks often may fail as a result of stress applied to the thin portion 56 of disk material beneath the score 54. It has been preferable to support the scored region of such prior art disks. Even with such support, the forces from the disk can cause a bending action at the score line, which may cause fatigue failure. As best seen in FIGS. 6(b) and 6(c), the forces transmitted from blow-out portion 58 are represented by arrow 59. These forces tend to cause a bending action as depicted in FIG. 6(c) when the pressure on the disk varies.

The present invention substantially minimizes or avoids the bending action seen in prior art disks as a result of the scoring method. In accordance with the present invention, one or more areas of weakness are defined in a reverse buckling rupture disk by an area or areas of material displaced by a partial shearing motion. The area(s) of weakness can be formed at the periphery of the rupturable member or in the main body of the member in a manner similar to cross scoring. These areas are capable of linearly accepting compression forces and carrying the forces or force vectors directly along a line from the rupturable member to the supporting flange of the disk.

Figure 8:
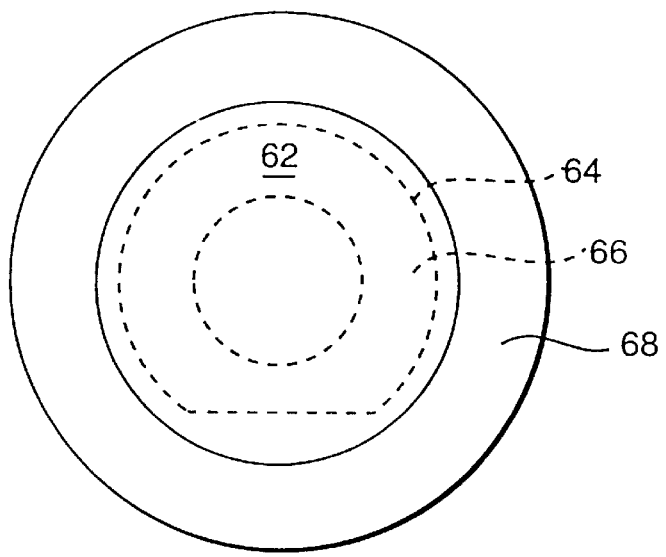
FIG. 8 is a top view taken along line 8—8 of FIG. 7.
Figure 9:
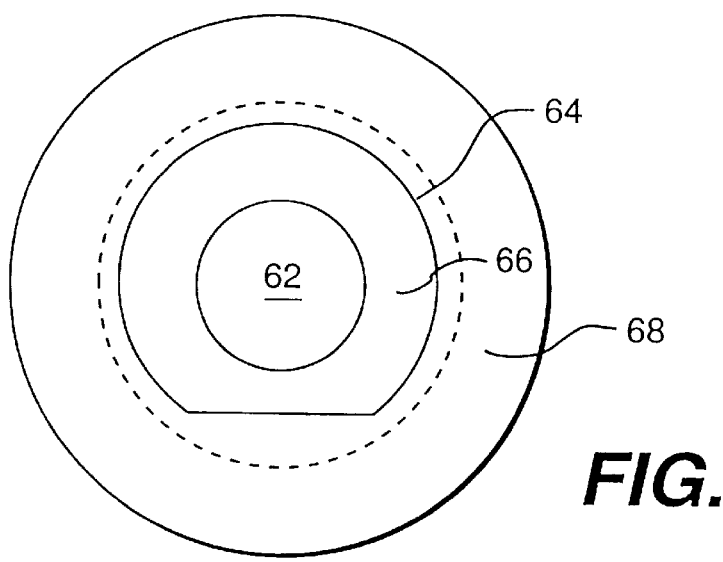
FIG. 9 is a bottom view taken along line 9—9 of FIG. 7.

The method and dies used for forming an area or areas of material displaced by the partial shearing motion in a rupture disk of this invention are illustrated in FIGS. 7–9. FIG. 7 illustrates the die 66 in the process of forming the weakened area. The weakened area includes a thinner cross section than the remainder of the disk as a result of having material displaced in a shear direction. The degree of displacement can vary depending on the desired cross section in the weakened area. The method of the present invention is believed to be capable of providing a weakened area of thinner cross section than conventional scoring techniques because it does not have the problem of work-hardened material forming under the score blade.

As illustrated in FIGS. 7–9, an area of weakness, generally designated by the numeral 64, can be formed in a rupture disk 62 by a pair of dies 66 and 68 connected to appropriate tooling (not shown). In the presently preferred embodiment, the die 66 is an annular ring utilized to stamp the area or areas of material displaced by the partial shearing movement into the rupture disk 62. The die 68 is a second annular ring having an inside diameter slightly larger than the outside diameter of die 66. In this embodiment, the faces of the dies are parallel and almost in alignment with each other. The die 68 holds the rupture disk in place during the stamping operation. As shown, the dies 66 and 68 are preferably offset whereby they do not collide if the weakened region 64 is formed too deeply. Thus, the method of the present invention for forming an area or areas of weakness in a rupture disk along which the disk ruptures is an improvement over prior art methods whereby the dies used can and do collide. For example, the tooling utilized for forming the score 54 in the rupture disk 52 illustrated in FIG. 5(c) includes dies which oppose each other similar to the dies illustrated in U.S. Pat. Nos. 4,441,350 and 4,458,516 cited above. If the score 54 is formed too deeply, the dies collide causing damage to the dies and sometimes to the tooling connected to the dies.

Referring again to FIGS. 1–4, in operation of the rupture disk assembly 10, pressurized fluid pressure from a vessel or system being protected is conducted to the rupture disk 28 by the inlet support member 12, but it is contained and prevented from entering the open interior of the outlet support member 14 by the rupture disk 28 so long as the pressure does not exceed the design rupture pressure of the rupture disk 28. The term "design rupture pressure" is used herein to mean that fluid pressure exerted on the convex side of the rupture disk at which the rupture disk 28 is designed to reverse buckling and rupture.

When the fluid pressure exerted on the rupture exceeds the design rupture pressure of the rupture disk 28, the disk reverse buckles and then tears in the area or areas of weakness 30 defined by the an area or areas of material displaced in a shear direction. When the blow-out portion 48 opens as a result of the rupture of the disk 28, it is forced downward by the pressurized fluid being relieved through the disk 28 into contact with the catcher bar 42 of the safety member 36. As illustrated in FIG. 4, the catcher bar reinforces the hinge area 50 so that as the hinge area 50 bends, the blow-out portion 48 does not tear away at the hinge area. Also, the extended portion of the catcher bar 42 contacts and "catches" the blow-out portion whereby its movement downward is slowed down and fragmentation of the blow-out portion 50 does not result. It is contemplated that members other than the catcher bar can form a part of safety member 36 to perform the same function.

As mentioned above, because the area of material displaced in a shear direction is not placed in appreciable stress during pressure cycling, the rupture disk 28 has a longer service life than comparable prior art reverse buckling rupture disks.

The rupture of the disk 28 is assured by the safety member 36. That is, the rupture initiating, stress concentrating points 44 provided on the interior edge of the safety member 36 will contact a portion of the weakened area 30 and cause the rupture disk 28 to rupture in the area or areas of weakness 30 when the concave-convex portion of the disk 28 reverses and is bent over the points 44 by fluid pressure.

As is well understood by those skilled in the art, when a reverse buckling rupture disk reverses without rupturing, it can resist rupture up to dangerous high fluid pressures because of having high tensile strength. Generally, a reverse buckling rupture disk must be designed to rupture in tension after reversal at a fluid pressure no greater than 1.5 times the design rupture pressure of the disk to assure the safe operation of the disk. The safety member 36, with its cut outs and stress concentration points, is designed to assure that the rupture disk 28 ruptures in tension at such a safe pressure level, if it reverses without rupture.

Figure 10:
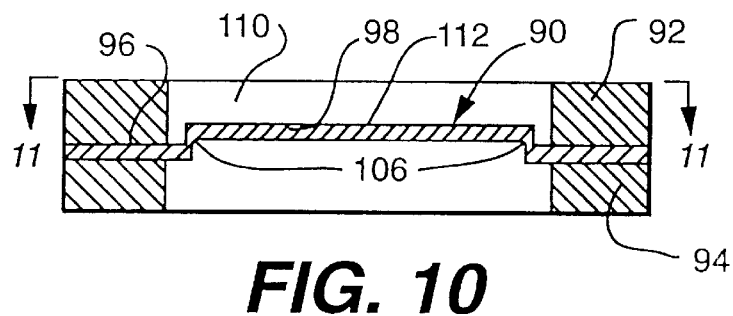
FIG. 10 is a side cross-sectional view of an assembly of the present invention which includes a forward acting rupture
Figure 11:
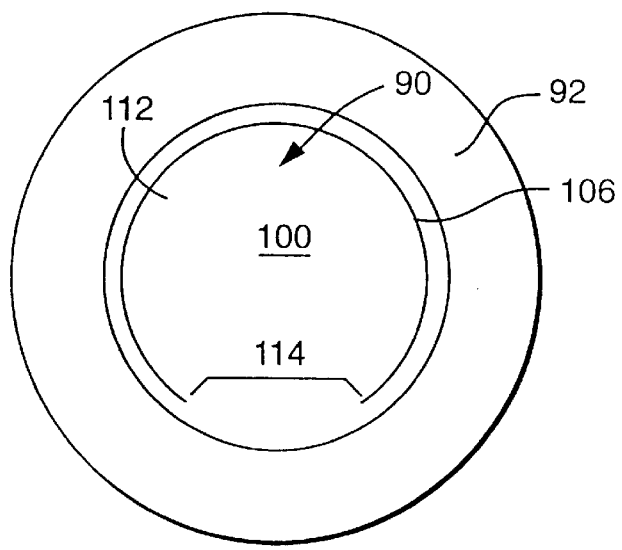
FIG. 11 is a top view taken along line 11—11 of FIG. 10.

Referring now to FIGS. 10 and 11, an alternate form of a rupture disk of the present invention generally designated by the numeral 90 is illustrated clamped between inlet and outlet support members 92 and 94. The rupture disk 90 is comprised of a rupturable member formed of a malleable material which includes an annular flat flange portion 96 connected to a central rupturable member portion 98. An area of material displaced by a partial shearing movement is formed in the rupture disk 90 to define an area weakness 106 in the disk 90. The area or areas of material displaced in a shear direction defines a substantially circular blow-out portion 112. An unweakened hinge area 114 in the rupture disk 90 connects the blow-out portion to the remainder of the disk after rupture. Support members 92 and 94 hold rupture disk 90 in place in the fluid passageway. Although not shown, safety member 36 can be utilized in connection with the assembly of FIG. 10. In such a case, safety member 36 would be disposed on the inlet or outlet side of the disk such that the stress concentration point will contact the area of weakness.

Figure 12:
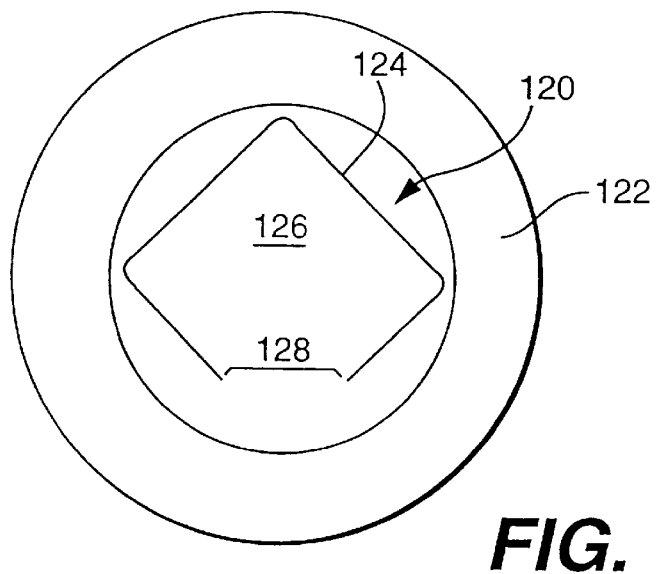
FIG. 12 is a top view similar to FIG. 11, but showing a forward acting rupture disk having an area of weakness of a different geometric shape from FIG. 11.

FIG. 12 illustrates another alternate embodiment of the rupture disk of the present invention generally designated by the numeral 120. The rupture disk 120 is clamped between an inlet support member 122 and an outlet support member (not shown). The assembly of FIG. 12 is identical to the assembly illustrated in FIGS. 10 and 11, except that the area of weakness 124 formed in the rupture disk 120 by an area or areas of material displaced by a partial shearing movement defines a substantially square blow-out portion 126 and an unweakened hinge area 128 in the rupture disk 120. As will be understood, the area or areas of weakness formed by an area or areas of material displaced in a shear direction in the rupture disk of this invention can define blow-out portions of various geometric shapes as dictated by design criteria.

The method of producing a rupture disk of the present invention which includes an area or areas of weakness along which the rupture disk ruptures comprises the steps of forming a rupturable member of malleable material having a pressurized fluid inlet side and an outlet side and adapted to be sealingly engaged in a pressurized fluid passageway. At least one area of material displaced by a partial shearing movement is formed to constitute an area of weakness in the rupture member. In a presently preferred embodiment, a male/female die set is used to form the area of displaced material. A die block is moved in a stamping or equivalent operation into contact with the disk. As shown in FIG. 7, the displacement of material by die block 66 is done in a partial shearing motion caused by the motion of the rupture disk dome relative to the disk flange. The resulting area includes a thinner cross-sectional area that will facilitate opening of the disk. In the instance of a domed rupture disk such as shown in FIG. 7, the thinned area is capable of withstanding pressure variations because of an arch-like connection of the dome, weakened area, and flange.

The area or areas of material displaced by the partial shearing movement are formed in the rupture disk in a configuration which forms an area or areas of weakness defining a blow-out portion in the rupture disk. The rupture disk preferably also includes an unweakened hinge area connected to the blow-out portion. As mentioned above, the blow-out portion defined by the area of weakness can take a variety of shapes, but is preferably circular.

The method of the present invention for assuring that a reverse buckling rupture disk having an area or areas of weakness formed therein ruptures after reverse buckling comprises placing an annular safety member adjacent to the rupture disk on the outlet side thereof which has at least one rupture initiating, stress concentrating point positioned to contact the rupture disk at the weakened region.

The present invention, therefore, is well adapted to meet the needs recited above and to carry out the objects and attain the ends and advantages mentioned as well as those inherent therein. While numerous changes can be made in the construction and arrangement of parts, such changes are encompassed within the spirit of this invention as defined by the appended claims.

What is claimed is:

1. A rupture disk assembly, comprising:
    an inlet rupture disk support member having an open interior for conducting pressurized fluid to a rupture disk supported thereby;
    an outlet rupture disk support member having an open interior for conducting pressurized fluids relieved through a rupture disk;
    a rupture disk formed of a malleable material and sealingly engaged between said inlet and outlet support members, said rupture disk having a convex surface on the side adjacent said inlet support member and a corresponding concave surface on the side adjacent said outlet support member and having an area of weakness therein which defines a blowout portion in said rupture disk; and
    a safety member having at least one rupture-initiating stress concentrating point positioned to contact said rupture disk at or about said area of weakness to ensure opening of the disk.

2. The assembly of claim 1, wherein the portion of said rupture disk including said convex surface and corresponding concave surface is circular in peripheral shape and is connected to an annular flat flange portion of said rupture disk.

3. The assembly of claim 1, wherein said blow-out portion defined in said rupture disk is substantially circular and the rupture disk includes an unweakened hinge area that corresponds to a chord of said blow-out portion.

4. The assembly of claim 1, wherein said safety member includes at least two of said stress concentrating points.

5. The assembly of claim 1, wherein said area of weakness in said rupture disk is formed by one or more scores in said rupture disk.

6. The assembly of claim 1, wherein said area of weakness in said rupture disk includes material displaced by a partial shearing motion.

7. The assembly of claim 1, wherein the safety member is attached to the rupture disk.

8. The assembly of claim 1, wherein the safety member is an annular ring and the stress concentrating point is formed at the intersection of two arcuate cut-outs in the annular ring.

9. A reverse buckling rupture disk assembly, comprising:
    an inlet annular rupture disk support member having an open interior for conducting pressurized fluid to a rupture disk supported thereby;
    an outlet annular rupture disk support member having an open interior for conducting pressurized fluids relieved through a rupture disk;
    a circular reverse buckling rupture disk formed of a malleable material and sealingly engaged between said inlet and outlet annular support members, said rupture disk having a convex surface in the side adjacent said inlet support member and a corresponding concave surface in the side adjacent said outlet support member and having at least one area of weakness including material displaced in a shear direction to form a thinner cross section than the remainder of the rupture disk, said area of weakness defining a blow-out portion connected by an unweakened hinge area in said rupture disk; and
    an annular safety member positioned between said rupture disk and said outlet support member, said safety member including a catcher bar for preventing said blow-out portion of said rupture disk from fragmenting or tearing away upon rupture, said catcher bar being positioned adjacent to said hinge area of said rupture disk and extending at least partially across said open interior of said outlet support member, and said safety member having at least one stress concentrating point positioned to contact said rupture disk at said area of weakness.

10. The assembly of claim 9, wherein said blow-out portion is substantially circular and said hinge area corresponds to a chord of said blow-out portion.

11. The assembly of claim 9, wherein said blow-out portion includes a generally concave-convex shape.

12. The assembly of claim 9, wherein said blow-out portion this flat.

13. The assembly of claim 9, wherein said safety member includes three stress concentration points, including one stress concentrating point disposed opposite said hinge area and two stress concentrating points disposed in opposing fashion on opposite sides of the annular safety member.

14. A method of assuring that a reverse buckling rupture disk having an area of weakness formed therein ruptures after reverse buckling comprising:

placing an annular safety member adjacent to said rupture disk on the outlet side thereof, said safety member having at least one rupture initiating stress concentrating point positioned to contact said rupture disk at or about the area of weakness when said rupture disk reverse buckles.

15. The method of claim 14, wherein said safety member includes two or more of said stress concentrating points.

16. The method of claim 14, wherein said area of weakness in said rupture disk is formed by scoring the rupture disk with a score blade.

17. The method of claim 14, wherein said area of weakness in said rupture disk is formed by displacing material through a partial shearing motion in a direction perpendicular to the plane of the annular safety member.

* * * * *

UNITED STATES PATENT AND TRADEMARK OFFICE
CERTIFICATE OF CORRECTION

PATENT NO.: 5,996,605

DATED: December 7, 1999

INVENTOR(S): Stephen P. Farwell

It is certified that an error appears in the above-identified patent and that said Letters Patent is hereby corrected as shown below:

Claim 12, Col. 10, line 59, change "this" to --is--.

Signed and Sealed this

Eighth Day of August, 2000

Attest:

Q. TODD DICKINSON

Attesting Officer

Director of Patents and Trademarks